United States Patent [19]

Lovitz

[11] Patent Number: 5,265,557
[45] Date of Patent: Nov. 30, 1993

[54] PET CAGE PERCH ASSEMBLAGE

[75] Inventor: David D. Lovitz, Short Hills, N.J.

[73] Assignee: The Hartz Mountain Corporation, South Harrison, N.J.

[21] Appl. No.: 909,010

[22] Filed: Jul. 6, 1992

[51] Int. Cl.[5] ............................................. A01K 31/12
[52] U.S. Cl. ....................................... 119/26; 119/24; 446/126
[58] Field of Search ..................... 119/24, 25, 26, 18; 446/107, 109, 126

[56] References Cited

U.S. PATENT DOCUMENTS

| 276,392 | 4/1883 | Gregory | 119/26 |
|---|---|---|---|
| 447,006 | 2/1891 | Sweeney | 119/26 |
| 1,347,808 | 7/1920 | Franklin | 446/107 |
| 1,879,318 | 9/1932 | Klein | 119/26 |
| 2,796,043 | 6/1957 | Albert | 119/24 |
| 3,789,800 | 2/1974 | Steudler | 119/18 |
| 4,078,328 | 3/1978 | Rayment | 446/126 |
| 5,010,848 | 5/1991 | Rankin | 119/26 |
| 5,022,345 | 6/1991 | Bolivar et al. | 119/26 |

Primary Examiner—John G. Weiss
Attorney, Agent, or Firm—Kuhn and Muller

[57] ABSTRACT

A modular bird or animal cage accessory assemblage generally made of resilient materials, includes interchangeable rods engageable with a C-shaped system clasp having a corresponding channel guide for receiving the rods therein. The rods are held in place by a combination of the position of the rods within corresponding channel guides of one or more clasps and by the use of central sphere branched connectors, which branched connectors may be rapidly and easily loosened for dismantling of the assemblage, so that the rods can be re-used in other configurations. A systematic plurality of rods is provided with incremental dimensioned variations, so that the size of the assemblage can be varied while preserving the ability to create hollow spaces between the rods. Expansion of the size of the containers is accomplished by axial connection of the rods.

12 Claims, 2 Drawing Sheets

U.S. Patent   Nov. 30, 1993   Sheet 1 of 2   5,265,557
FIG. 1
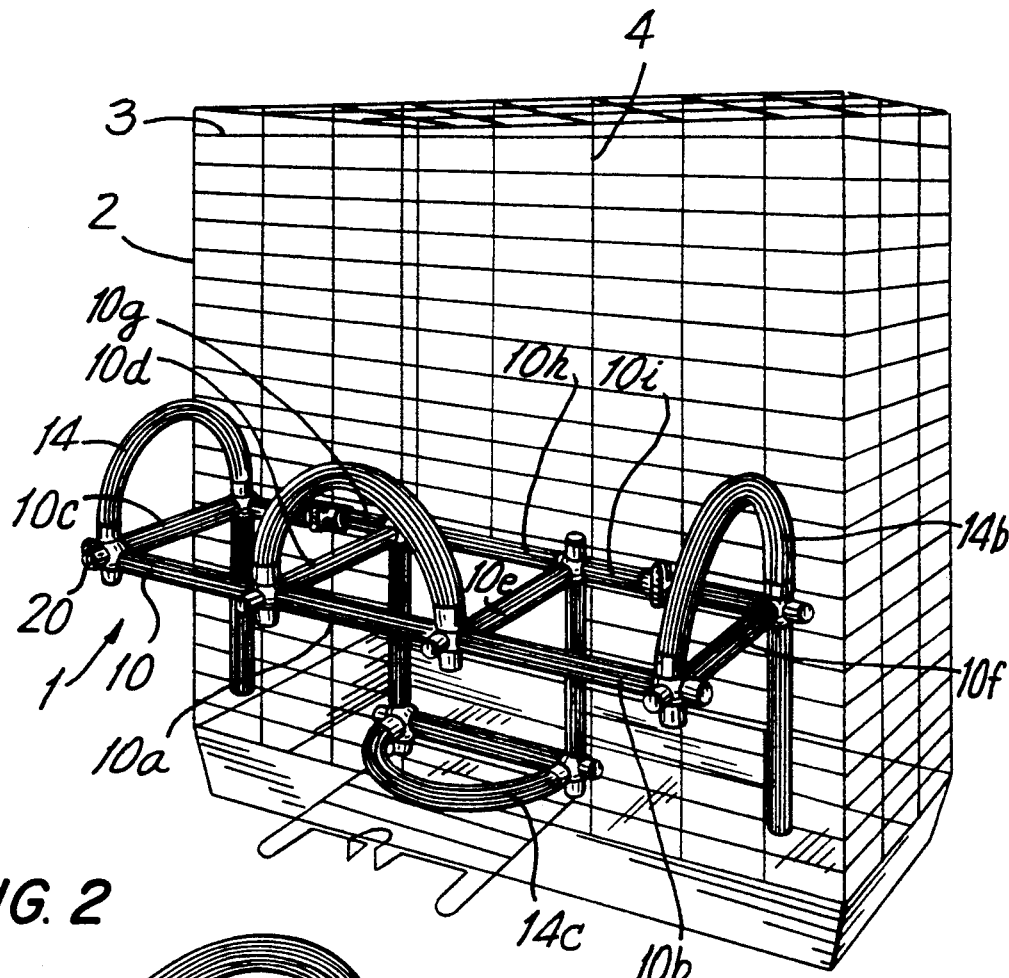
FIG. 2
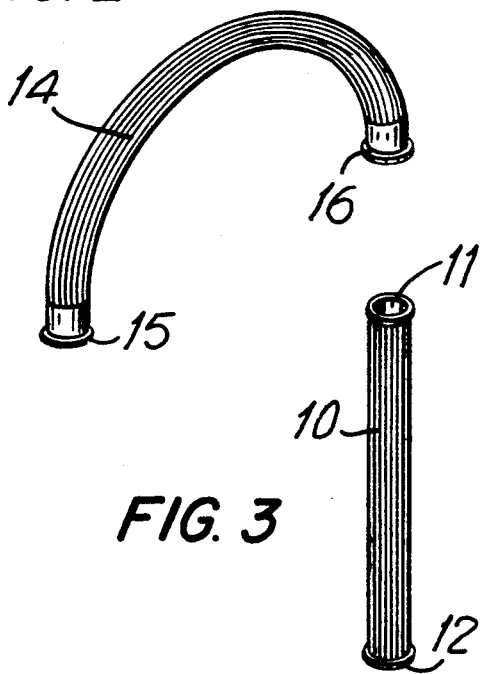
FIG. 3
FIG. 10
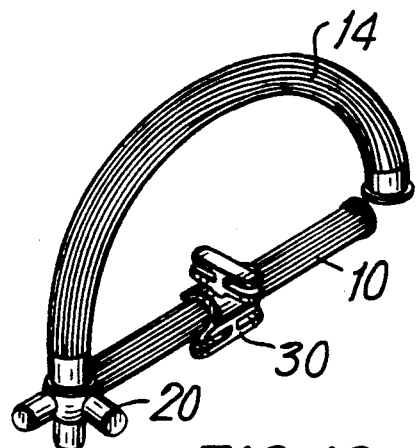

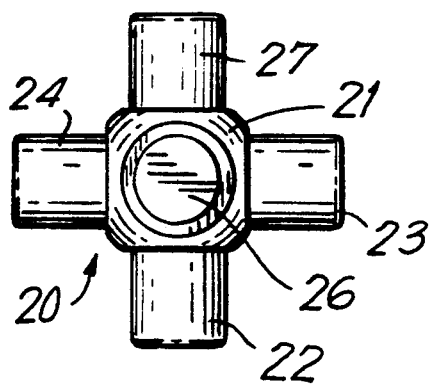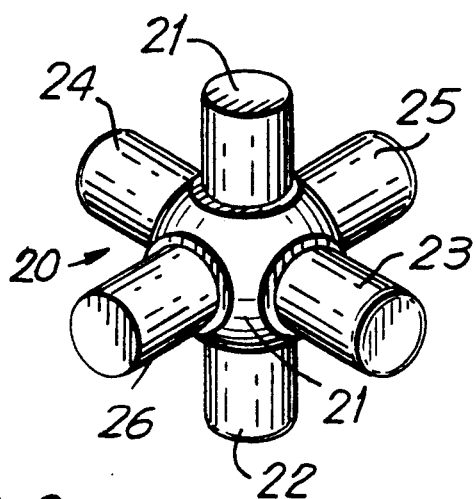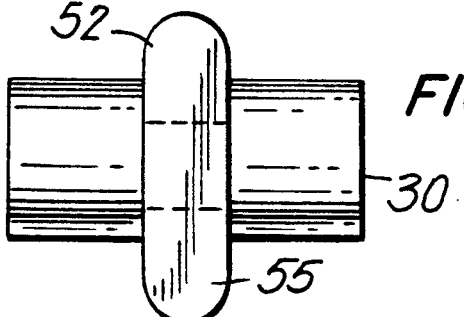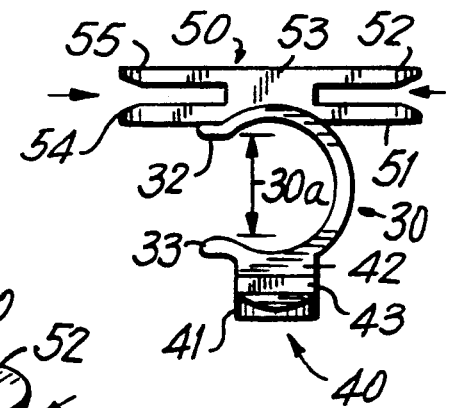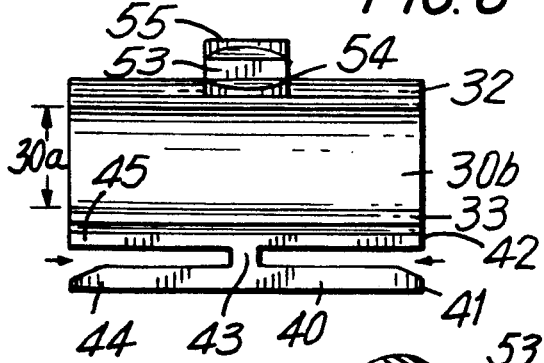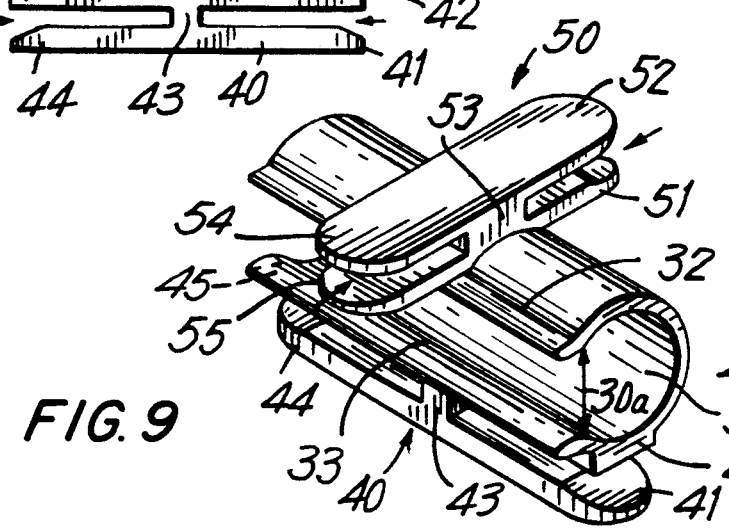

PET CAGE PERCH ASSEMBLAGE

The present invention refers to a new system of modular bird climbing perch assemblage for mounting to a bird or animal cage.

BACKGROUND OF THE INVENTION

Currently, bird cage accessory toys and perches are known in the art. These bird cage accessory toys and perches, however, are deficient in that they generally include only one embodiment, thereby preventing the bird fancier from building accessory assemblages according to the bird fancier's choice.

In the known bird cage accessory devices, whether decorative or utilitarian, the bird fancier is limited in that he cannot vary the configuration of the accessory device according to individual taste. The demand by bird fanciers for accessory devices requires that each device be assembled under individual specifications, creating limited design options and restrictions of fasteners for each device. This is due to the fact that there are no economical modular bird cage accessory assemblages available which can be easily assembled, disassembled, and expanded in any direction, so as to adapt to various dimensions, and which are reusable with universally interchangeable fastener pieces to fasten the modular components together and to the bird cage frame itself.

Various attempts have been made to construct interchangeable bird cage devices. These systems, however, have limited, unrelated features such as a perch or a chewing rawhide, and cannot be expanded in size without strict limitations. Furthermore, these systems do not provide for a bird cage assemblage with spatial continuity by interchangeably positioned components within a three-dimensional construction for a bird cage perch assemblage of varying configurations and dimensions.

DISCUSSION OF THE PRIOR ART

The prior art includes U.S. Pat. No. 4,927,674 of Smith for a woven wire apparatus, such as a web structure which may be used as a collapsible bird cage or animal confinement, playpens, shelters, trellises, plant covers, greenhouses, and jungle gyms, as well as other movable, portable yard toy structures.

In addition, U.S. Pat. No. 5,030,485 of Meeks et al for a painted decor macrame simulated bird cage includes an artificial bird suspended by a thin satin ribbon from the top portion within the basket frame structure so that the basket frame structure simulates a bird cage.

A number of differing attachment means are possible for attaching perches in the present invention, which includes flattened clip pieces placed at a variety of angles in relation to each other and the bars of the bird cage.

U.S. Pat. No. 5,010,848 of Rankin describes a folding travel cage which is folded substantially flat or assembled into a rectangular cage wall assembly having a top, corners and four rectangular sides hingeably interconnected at the corners for placement on said cage wall base structure to form a bird cage of a height suitable to allow placement of said bird cage in an automobile seat, thereby providing a bird cage suitable for travel.

U.S. Pat. No. 4,917,047 of Watezer describes a modular component knock-down animal cage structure and assembly.

U.S. Pat. No. 4,785,766 of Blalock describes an avian carrier apparatus.

U.S. Pat. No. 5,022,345 of Bolivar describes a bird toy including one bead of plastic or wood. The elements may be mounted on a length of chain, rope, or wire, and suspended from a part of a bird cage by a key-ring or from a cantilevered support perch attached to the side of the cage. A fastener is provided for attaching the toy to the bird cage, including a perch, with a clamping means, which permits securing the perch to the side of the cage. In this toy, a cowbell is attached to the bottom of the chain.

U.S. Pat No. 5,018,480 of Goldman includes a simulated tree branch for small animal enclosures with a universal clip, for attaching the simulated branch to a bird cage bar.

U.S. Pat. No. 4,627,384 of Courteau describes a bird tree apparatus.

U.S. Pat. No. 4,542,714 of Ingraham describes a hanging perch for a bird cage.

U.S. Pat. No. 4,150,505 of Voelker discloses a bird trap and cat feeder.

U.S. Pat. No. 3,919,977 of Clark describes a seed feeding device for birds wherein the storage enclosure extends toward the perch up to the side of the housing provided with an opening, to define a room for the bird standing on the perch, a hook means on the side of the housing for attaching the device on the outer surface of a bird cage in front of an opening provided in the bird cage.

U.S. Pat. No. 3,774,576 of Moore includes a similar cage wherein various levels are provided in stacked relationship.

U.S. Pat. No. 3,554,165 of Carter describes a mountable tray force bird cage.

U.S. Pat. Nos. 2,796,043 of Albert, 2,725,851 of Futterer, 2,718,209 of Ross, 2,707,937 of Herman, 2,707,936 of Kiehl, 2,531,915 of Maly, 2,013,058 of Leindorf, 1,961,171 of Sanford, 1,956,652 of Oliver and 1,912,704 of Graham describe perches for bird cages. In Graham '704, Oliver '652, Sanford '171, Leindorf '058, Maly '915 and Albert '043 the perches are attached to the wire walls of the bird cage by a variety of fastening members.

SUMMARY OF THE INVENTION

With the present invention, one can build modular bird cage accessories whose components can be assembled into modular climbing gyms for birds capable of building up into large containers with various interior spaces to accommodate birds for exercise and rest. The design configuration of the assemblage during use can be varied by replacing the component members and fasteners.

In this frame of reference, the assemblage system of the present invention was created and designed to provide the bird fancier with a variety of decorative and utilitarian climbing gyms for birds, due to its special characteristics.

The system proposed is based on the connection of modular rods or posts, generally made of plastic or wood, which are preferably tubular, which are connected using sphere connectors with six equidistant branched extension members for engaging the tubular rods, and clasps, such as C-shaped clasps, in order to structurally attach the rods to adjacent bird cage wires, resulting in their placement within and upon the bird cage wires by fasteners with guides or channels, for easy connection of the clasps to the vertical and horizontal bird cage wires. It is contemplated that the assemblage may be made of plastic, wood, metal, with or without hollow, tubular rods or posts. For the hollow tubular rods, the branches of the connectors engage the hollow interior ends of the tubular rods. If the rods are solid, they require reciprocal hollow fasteners at each end for engagement with the branches of the connectors.

The present invention allows building modular spaces which are easily disassembled. The rods or posts can expand in any direction, by adding modular rods or posts making up the system, and by using connectors with branch extension members for perpendicular, axial or longitudinal connections. Further joints to the bird cage wires hold the assemblage of modular connectors in place.

As for the design of the rods or posts, they are of two types: those which are linear in nature and configuration, and those which are semi-circular in nature and configuration. The semi-circular rods or post may be used to create arches, or combined for circular components.

The system is not limited as far as dimensions are concerned, except for limitations due to size restrictions of the bird cages, to which the assemblages are attached.

In the clasps that hold the rods or posts, there is provided a centrally located tubular C-shaped clasp extending axially perpendicular to the plane defined by the C-shaped ends of the clasp, thus providing a tube like structure interrupted by a gap extending axially parallel to the aforesaid axis extending perpendicular to the aforementioned plane defined by the C-shaped ends of the clasp. The aforementioned gap opens to a hollow channel within the aforementioned C-shaped clasp for engaging the rod or post therein, such that the longitudinal axis of the rod or post is parallel to the longitudinal axis of the tubular C-shaped clasp.

Above the tubular C-shaped clasp is positioned an H-shaped double sided clip having a vertical support wall having two oppositely extending pairs of parallel extension members, each pair defining a channel or guide therein capable of receiving either a horizontal or a vertical bird cage structural wire therein, to attach the assemblage to the walls defined by the bird cage wires. The pairs of parallel extension members on top of the tubular C-shaped clasp extend axially in a longitudinal direction perpendicular to the longitudinal axis of the tubular C-shaped clasp. In doing so, either of the upper top pairs of parallel extension members permit the placement of the rod or post inserted therein in a direction parallel to the surface of the bird cage defined by the bird cage wires.

Below the tubular C-shaped clasp is positioned a further H-shaped double sided clip also having a vertical support wall having two oppositely extending pairs of parallel extension members, each pair also defining a channel or guide therein capable of receiving either a horizontal or vertical bird cage structural wire therein, to attach the assemblage to the walls defined by the bird cage wires.

The pairs of parallel extension members below the tubular C-shaped clasp extend axially in a longitudinal direction parallel to the longitudinal axis of the tubular C-shaped clasp. As a result, either of the lower top pairs of parallel extension members permit the placement of the rod or post inserted therein in a direction perpendicular to the surface of the bird cage defined by the bird cage wires. Consequently, one can construct three-dimensional design configurations extending outward from or inward within the surface of a bird cage.

Either end of a rod or post may be inserted into one of the six equidistant branch extension members extending from a central, preferably spheroid, nodule of a six branched connector for connecting rods or posts with one another. Therefore, the six branched connector may extend the rods or posts in six equidistant directions, either vertically up or down, horizontally left or right in an axis parallel to the plane of a surface of the bird cage, or forward or backwards, in an axis perpendicular to the plane of a surface of the bird cage.

OBJECTS OF THE INVENTION

It is an object of the invention to provide a novel coupling assemblage for bird or animal cages.

It is a further object of the invention to provide easily accessible components for replacement or addition.

A further object of the invention is to provide a bird cage assemblage which is an improvement over existing bird cage perch devices.

The novel features which are considered as characteristic of the invention are set forth in particular in the appended claims. The invention itself, however, both as to its construction and method of operation, together with additional objects and advantages thereof, will best be understood from the description of specific embodiments when read in connection with the drawings.

DESCRIPTION OF THE DRAWINGS

For the purpose of clarity, the invention is illustrated in the following series of drawings, which represent one embodiment of the invention, given as an example.

In the drawings:

FIG. 1 is a perspective view of an assembled modular bird cage accessory, shown attached to a surface.

FIG. 2 is a perspective view of a curved modular rod member of the modular bird cage accessory.

FIG. 3 is a perspective view of a linear modular rod member of the modular bird cage accessory.

FIG. 4 is top view of a modular six branched connector for the rods of the modular bird cage accessory.

FIG. 5 is a perspective view of a modular six branched connector for the rods of the modular bird cage accessory.

FIG. 6 is a top view of a modular C-shaped clasp for attaching the rods to the wires of a bird cage.

FIG. 7 is a right side elevational view of the C-shaped clasp for attaching the rods to the wires of a bird cage.

FIG. 8 is a front elevational view of the C-shaped clasp for attaching the rods to the wires of a bird cage.

FIG. 9 is a perspective view of the C-shaped clasp for attaching the rods to the wires of a bird cage.

FIG. 10 is close up view of a rod of the modular bird cage accessory connected with the connector of FIGS. 4 and 5 and with the C-shaped clasp of FIGS. 6–8.

LIST OF REFERENCE NUMERALS:

1. assemblage
2. bird cage
3. horizontal bird cage wires
4. vertical bird cage wires
10. straight tube component
11. top edge opening of straight tube component
12. bottom edge opening of straight tube component
14. curved tube component
15. one end of curved tube component 16. distal end of curved tube component
20. six branched connector for tubes
21. base of six branched connector tubes 22-27. extension branches of connector for tubes
30. C-shaped clasp for engaging tube with bird cage wires
31. C-shaped component of C-shaped clasp
32. lateral top edge of gap intersecting the C-shaped component
33. lateral bottom edge of gap intersecting the C-shaped component
40. H-shaped clip supporting and parallel to axis of C-shaped clasp on bottom
43. central support member of H-shaped clasp on bottom 41,42-44,45. wings of H-shaped clip
50. H-shaped clip supporting C-shaped clasp from above-axis is perpendicular to axis of C-shaped clasp
51,52-54,55. wings of H-shaped clip on top
53. central support member of H-shaped clip on top.

DETAILED DESCRIPTION OF THE PREFERRED EMBODIMENT

As shown in FIGS. 1-10, there is provided a modular bird cage accessory assemblage 1 for a bird or animal cage 2, the assemblage having rods 10 and 14 which can be assembled into modular climbing gyms for birds or animals, facilitating their use, capable of building up into large containers with various interior spaces to accommodate birds for exercise and rest. The design configuration of the assemblage 1 during use can be varied by adding to or replacing the component rods 10 and 14 and fasteners 20 and 30.

The system proposed is based on the connection of curved rods 14, 14a, 14b, 14c, etc. and linear rods or posts 10, 10a, 10b, 10c, etc., generally made of plastic, and preferably tubular which rods are connected using branched sphere connectors 20 with base sphere 21 and six equidistant branched extension members 22-27 for engaging the tubular rods 10 and 14, and by using clasps 30, such as C-shaped clasps, in order to structurally attach the rods 10 and 14 to adjacent bird cage wires 3 and 4, resulting in their placement within and upon the bird cage wires 3 and 4 by fasteners 53 with guides or channels, for easy connection of the clasps 30 to the bird cage wires 3 and 4. The assemblage 1 may be made of plastic, wood, metal, with or without hollow, tubular rods or posts 10 and 14. For the hollow tubular rods, the branches of the connectors 20 engage the hollow interior ends 11, 12 and 15, 16 of the tubular rods 10 and 14, respectively. If the rods are solid, they require reciprocal hollow fasteners at each end for engagement with the branches of the connectors.

The present invention allows building modular assemblages 1, which are easily disassembled. The rods or posts 10 and 14 can expand in any direction, by adding modular rods or posts 10 or 14 making up the assemblage 1, and by using connectors 20 with branch extension members 22 and 27 for perpendicular, axial or longitudinal connections. Further joints 30 to the bird cage wires 3 and 4 hold the assemblage 1 of modular connectors in place.

As for the design of the rods or posts, they are of two types: rods 10 which are linear in nature and configuration, and rods 14 which are semi-circular in nature and configuration. The semi-circular rods or posts 14 may be used to create arches, or combined for circular components.

The system is not limited as far as shape or dimensions are concerned, except for limitations due to size restrictions of the bird cages 2, to which the assemblages 1 are attached.

In the clasps that hold the rods or posts 10 and 14, there is provided a centrally located tubular C-shaped clasp 30 extending axially perpendicular to the plane defined by the C-shaped ends of the clasp 30, thus providing a hollow tube like structure 31 interrupted by a gap 30a extending axially parallel to the aforesaid axis extending perpendicular to the aforementioned plane defined by the C-shaped ends of the clasp 30. The aforementioned gap 30a opens to a hollow vacuity channel 30b within the aforementioned hollow tubular structure 31 of C-shaped clasp 30 for engaging the rod or post 10 and 14 therein, such that the longitudinal axis of the rod or post 10 or 14 is parallel to the longitudinal axis of the tubular C-shaped clasp 30.

On one side, such as above, the tubular C-shaped clasp 30 is positioned on an H-shaped double sided clip 50 having a vertical support wall 53 having two oppositely extending pairs 51, 52 and 54, 55 of parallel extension members, each pair 51, 52, and 54, 55 defining a channel or guide therein capable of receiving either a horizontal or a vertical bird cage structural wire 3 or 4 therein, to attach the assemblage 1 to the walls defined by the bird cage wires 3 and 4. The pairs 51, 52 and 54, 55 of parallel extension members on top of the tubular C-shaped clasp 30 extend axially in a longitudinal direction perpendicular to the longitudinal axis of the tubular C-shaped clasp 30. In doing so, either of the upper top pairs 51, 52 and 54, 55 of parallel extension members permit the placement of the rod or post 10 and 14 inserted therein in a direction parallel to the surface of the bird cage 1 defined by the bird cage wires 3 and 4.

On an opposite side of the tubular C-shaped clasp 30 is positioned a further H-shaped double sided clip 40 also having a vertical support wall 43 having two oppositely extending pairs 41, 42 and 44, 45 of parallel extension members, each pair 41, 42 and 44, 45 also defining a channel or guide therein capable of receiving either a horizontal or vertical bird cage structural wire 3 or 4 therein, to attach the assemblage 1 to the walls defined by the bird cage wires 3 and 4.

The pairs of parallel extension members 41, 42 and 44, 45 below the tubular C-shaped clasp 30, however, extend axially in a longitudinal direction parallel to the longitudinal axis of the tubular C-shaped clasp 30. As a result, either of the lower top pairs 41, 42 and 44, 45 of parallel extension members permit the placement of the rod or post 10 or 14 inserted therein in a direction perpendicular to the surface of the bird cage 2 defined by the bird cage wires 3 and 4.

Consequently, one can construct three-dimensional design configurations extending outward from or inward within the surface of a bird cage 2.

Either end of a rod or post 10 or 14 may be inserted over one of the six equidistant branch extension members 22-27 extending from a central, preferably spheroid, nodule 21 of a six branched connector 20 for connecting rods or posts 10 or 14 with one another. Therefore, the six branched connector 20 may extend the rods or posts 10 or 14 in six equidistant directions, either vertically up or down, horizontally left or right in an axis parallel to the plane of a surface of the bird cage 2, or forward or backwards, in an axis perpendicular to the plane of a surface of the bird cage 2.

Each connector 20 is provided with longitudinally extending projections 22-27 receivable within hollow tubular rods 10 or 14. The respective rods 10 or 14 are interconnected by the positions of the projections 22-27 with respect to each of the connectors 20.

The tubular rods 10 or 14 are preferably made of a generally resilient material, such as plastic, reinforced artificial or natural rubber or other products of various suitable grades. In addition, the rods 10 or 14 can alternatively be metallic or wood, with additional hollow fasteners (not shown) for engaging projections 22-27 of connectors 20.

In summary, the projections 20-27 of the connectors 20 engage the rod 10-14 in any of six directions of placement.

The design configurations obtained with this modular assemblage 1 can be extended in either direction, by adding modular rods 10 or 14 forming the system; for this purpose, connectors of the type referenced as 20 are used, with one pair of projections for perpendicular connections, and opposite pairs of projections used for axial connections.

This type of expansion of the rods 10 or 14 is represented in FIG. 1 and in details of FIG. 10. In FIG. 1, various curved and linear rods 10 or 14 are shown, linked with other rods 10 or 14 by connectors 20 and C-shaped clasps 30. The clasps 30 have upper and lower channels engageable within the bird cage wires 3 and 4 or bird cage 1.

In essence, the invention can be applied in practice in other designs, with different details than those shown as an example in the description depicted in FIG. 1, in other projections. The rods 10 or 14 can be supplied with an original unit size and incrementally larger sizes in accordance with the above relationship of increasing sizes, to enable the bird fancier to appreciate varying sizes of construction proportions.

Therefore, the assemblage 1 can be built in any shape and size, with varied materials and configurations without departing from the spirit of the claims.

I claim:

1. A modular pet cage perch accessory assemblage for said pet cage, wherein said pet cage includes a plurality of pet cage wires, said assemblage comprising:

at least one rod each said at least one rod extending in a longitudinal direction, each said at least one rod engageable with a connector capable of connecting said at least one rod to another of said rods, said connector having at least one connection in at least one direction, each said connection capable of engaging and projecting said rod in an outward direction;

said at least one connection capable of projecting each of said at least one rod in one or more directions parallel to a plane of a surface of said pet cage or in at least one direction perpendicular to a plane of a surface of said pet cage;

at least one clasp engageable with said a least one rod, said at least one clasp having a tubular configuration extending in a longitudinal axis, said at least one clasp having an outer surface interrupted by a gap extending parallel to said longitudinal axis of said at least one clasp, said at least one clasp having a C-shaped configuration at each end of said at least one clasp;

said at least one clasp having an inner hollow vacuity for receiving a portion of said at least one rod therein;

said at least one clasp further having at least one connection clip with a channel provided therein for engaging said at least one clasp to a wire of said pet cage.

2. The modular pet cage perch accessory assemblage for a pet cage as in claim 1, wherein said at least one clasp further comprises two or more pairs of parallel extension members defining a channel for receiving at least one of said pet cage wires therein.

3. The at least one clasp as in claim 2, further comprising one first of said two or more paris of parallel extension members extending opposite in a common longitudinal axis to a second of said two or more pairs of parallel extension members;

said first pair of parallel extension members and said second pair or parallel extension members being positioned at one side of said at least one clasp in a direction perpendicular to said longitudinal axis of said at least one clasp; and a third pair of parallel extension members and a fourth pair of parallel extension members being both positioned at a further opposite side of said at least one clasp, said third pair of parallel extension members and said fourth pair of parallel extension members both extending opposite in a common longitudinal axis of said at last one clasp;

said third pair of parallel extension members and said fourth pair of parallel extension members both positioned at an opposite side of said at least one clasp in a direction parallel to said longitudinal axis of said at least one clasp.

4. A modular pet cage perch accessory assemblage for a pet cage comprising at least one modular, hollow, tubular rod connectable to a spheroid connector, said spheroid connector having a plurality of equidistant branch extensions for engaging within an end of said at least one modular, hollow, tubular rod;

said at least one modular, hollow, tubular rod further connectable to at least one modular C-shaped clasp member, said at least one modular C-shaped clasp member having integral therein two or more connection clips to receive a wire of said pet cage therein for fastening said assemblage to said pet cage.

5. The at least one modular, hollow, tubular rod as in claim 4, wherein said at least one modular, hollow, tubular rod has a semicircular shape.

6. The at least one modular, hollow, tubular rod as in claim 4, wherein said at least one modular, hollow, tubular rod has a linear shape.

7. An assemblage for a pet cage, having a plurality of horizontal cage wires and vertical cage wires, said assemblage comprising at least one tubular component, said at least one tubular component having a top edge opening and a bottom edge opening;

said at least one tubular component having one proximal end and one opposite distal end;

a multi-branched connector engageable with said at least one tubular component, said multi-branched connector having a base and a plurality of extension branch projections;

a C-shaped clasp for engaging said at least one tubular component with said at least one of said plurality of cage wires, said C-shaped clasp having at least one partially tubular C-shaped component, said C-shaped clasp having a lateral top edge, and a lateral bottom edge; said at least one partially tubular component bearing a gap, said gap having a longitudinal axis parallel to a longitudinal axis of said partially tubular C-shaped tubular component, said C-shaped component having an H-shaped clip located parallel to said longitudinal axis of said C-shaped clasp on one side of said C-shaped clasp and a plurality of parallel wings of said H-shaped clips, a central support member for said H-shaped clip wings being located below said partially tubular C-shaped clasp, a further H-shaped clip supporting said partially tubular C-shaped clasp from above, said further H-shaped clip having an axis perpendicular to said longitudinal axis of said partially tubular C-shaped clasp, a further plurality of parallel wings of said H-shaped clip being located on another side of said partially tubular C-shaped clasp; and a central support member for said H-shaped clip wings on top of said partially tubular C-shaped tubular clasp.

8. An improved system of a pet cage assemblage, wherein said pet cage includes a plurality of pet cage wires, said assemblage comprising a plurality of modular components, each of said modular components being hollow tubular rods, which said hollow tubular rods are engageable with a joining means for maintaining the components stable, said joining means including connectors having at least one projection acting as at least one male part, and said hollow tubular rods having at least one female part, said at least one female part being engageable with said at least one male part to obtain a functional position for said hollow tubular rods, thus creating an assemblage of said rods with a varied three-dimensional configuration, said hollow tubular rods engageable with said wires of said pet cage in a plurality of directions, an assembly means between said hollow tubular rods and said cage wires, said means comprising a number of channel guides engageable with at least one clasp for said hollow tubular rods, and said channel guides being engageable with at least two opposed sides of said clasp.

9. The assemblage as in claim 8, further comprising a means to facilitate the expansion of the assemblage in either direction through the axial additional of said hollow tubular rods, said means comprising the axial connection of said hollow tubular rods by the intervention of said connectors, said connectors provided with at least one projection engaging said rods.

10. The system as in claim 8, further comprising a plurality of channels disposed to said at least one clasp said plurality of channels being located alternately parallel and perpendicular with a plane of the longitudinal axis of said at least one clasp, and said channels being reciprocally grooved to receive said pet cage wires within said channels.

11. The hollow tubular rods as in claim 8, wherein said rods are straight.

12. The hollow tubular rods as in claim 8, wherein said rods are curved.

* * * * *